(12) United States Patent
Betta et al.

(10) Patent No.: US 6,944,157 B1
(45) Date of Patent: Sep. 13, 2005

(54) TIME MANAGEMENT OF INFORMATION DISTRIBUTED ON K-BYTES IN SDH FRAMES

(75) Inventors: Alessandro Betta, Cernusco sul Naviglio (IT); Andrea Manganini, Villasanta (IT); Vittorio Mascolo, Lodivecchio (IT)

(73) Assignee: Alcatel, Paris (FR)

( * ) Notice: Subject to any disclaimer, the term of this patent is extended or adjusted under 35 U.S.C. 154(b) by 554 days.

(21) Appl. No.: 09/588,945

(22) Filed: Jun. 7, 2000

(30) Foreign Application Priority Data

Jun. 9, 1999  (IT) .............................. MI99A1277

(51) Int. Cl.$^7$ ............................................. H04L 12/56
(52) U.S. Cl. ...................................... 370/392; 370/474
(58) Field of Search ................................ 370/470, 472, 370/474, 476, 503, 505, 506, 392, 471, 475; 375/362, 363, 365, 366; 398/43, 58, 98

(56) References Cited

U.S. PATENT DOCUMENTS 5,631,896 A * 5/1997 Kawase et al. ............. 370/228
6,094,737 A * 7/2000 Fukasawa ................... 714/738
6,714,531 B1 * 3/2004 Oide et al. .................. 370/349

OTHER PUBLICATIONS

ITU-T Recommendation G.841 (Feb. 1998).
ITU-T Recommendation G.707 (Mar. 1996).

* cited by examiner

*Primary Examiner*—Man U. Phan
*Assistant Examiner*—Toan D. Nguyen
(74) *Attorney, Agent, or Firm*—Sughrue Mion, PLLC

(57) ABSTRACT

A SONET/SDH frame providing for an optimized management of K1 and K2 bytes of protection protocol and providing for the management of a number of nodes higher than sixteen, which is the highest number which is provided for at the present time. In practice, the bits of a third byte (K0) of Multiplex Section OverHead are used in such a way that at least one of them represents a Source Node IDentification Extension bit, at least one of them represents a Destination Node IDentification Extension bit and at least one bit of those remaining indicates a change of the information in said first, second or third bytes (K1, K2, K0). In this way, the nodes which can be managed can be even 128 and the switching rate could be highly increased.

20 Claims, 1 Drawing Sheet

| Byte K0 | | | | | | | |
|---|---|---|---|---|---|---|---|
| TOGGLE: Change of Information | | | | IDSNE: Source Node IDentification Estension | | IDDNE: Destination Node IDentification Estension | |
| bit $a_{K01}$ | bit $a_{K02}$ | bit $a_{K03}$ | bit $a_{K04}$ | bit $a_{K05}$ | bit $a_{K06}$ | bit $a_{K07}$ | bit $a_{K08}$ |

Fig. 1

Byte K0

| bit a_{K01} | bit a_{K02} | bit a_{K03} | bit a_{K04} | bit a_{K05} | bit a_{K06} | bit a_{K07} | bit a_{K08} |
|---|---|---|---|---|---|---|---|
| TOGGLE: Change of Information | | | | IDSNE: Source Node IDentification Estension | | IDDNE: Destination Node IDentification Estension | |

Fig. 2

Byte K0

| bit a_{K01} | bit a_{K02} | bit a_{K03} | bit a_{K04} | bit a_{K05} | bit a_{K06} | bit a_{K07} | bit a_{K08} |
|---|---|---|---|---|---|---|---|
| TOGGLE: Change of Information | | IDSNE: Source Node IDentification Estension | | | IDDNE: Destination Node IDentification Estension | | |

Fig. 3

Byte K1

| bit a_{K11} | bit a_{K12} | bit a_{K13} | bit a_{K14} | bit a_{K15} | bit a_{K16} | bit a_{K17} | bit a_{K18} |
|---|---|---|---|---|---|---|---|
| Bridge Request Code | | | | IDDN: Destination Node IDentification | | | |

Byte K2

| bit a_{K21} | bit a_{K22} | bit a_{K23} | bit a_{K24} | bit a_{K25} | bit a_{K26} | bit a_{K27} | bit a_{K28} |
|---|---|---|---|---|---|---|---|
| IDSN: Source Node IDentification | | | | Path Length | Node Status | | |

TIME MANAGEMENT OF INFORMATION DISTRIBUTED ON K-BYTES IN SDH FRAMES

BACKGROUND OF THE INVENTION

1. Field of the Invention

The present invention concerns the field of synchronous telecommunication networks such as SDH or SONET telecommunication networks and in particular it concerns protection architectures of SDH/SONET networks. Still more in particular, it concerns the optimization of information of the K-bytes.

2. Description of the Prior Art

As far as for example SDH frames are concerned, it is known from the ITU-T Recommendation G.707 that they are formed by structures which are nested at several synchronous multiplex layers whose basic components are called Synchronous Transport Modules level N (STM-N, N=1, . . . ) indicating the bit rate (for instance, STM-1 155 Mb/s, STM-16 2488 Mb/s). Each STM-N module comprises a header portion termed Section Overhead (SOH), containing management and synchronization auxiliary information, and a subsequent portion termed Information Payload containing the informative part.

The information of the SOH section is classified into Regeneration Section Overhead (RSOH) and Multiplex Section Overhead (MSOH) which passes through the regenerators in a transparent manner. In particular, in the MSOH section there is a plurality of bytes located at very definite standardized positions and bytes reserved for purposes to be defined and standardized.

As defined by ITU-T Recommendation G.841, the Automatic Protection Switching (briefly, APS) protocol of a telecommunication ring is carried on two special bytes, the so-called K1 and K2 bytes, of the MSOH section. In particular, the same ITU-T Recommendation G.841 provides that, as far as the K1 byte is concerned (see FIG. 3), its first four bits (bits $a_{K11}$, $a_{K12}$, $a_{K13}$, $a_{K14}$) carry bridge request codes (codes requesting transmitting identical traffic over protection and working channels) whereas the subsequent four bits (bits $a_{K15}$, $a_{K16}$, $a_{K17}$, $a_{K18}$) carry identifications (IDs) of the destination node for the bridge request code indicated in the first four bits. The function of the byte K2 (see again FIG. 3) is as follows: the first four bits (bits $a_{K21}$, $a_{K22}$, $a_{K23}$, $a_{K24}$) carry source node identification; bits $a_{K26}$, $a_{K27}$, $a_{K28}$, define the status of the node whereas the fifth bit ($a_{K25}$) represents a path length code (0=short path, 1=long path).

For example, as far as the 2 fiber, 4 fiber and transoceanic MS-SPRING protections are concerned, the problem of increasing the number of nodes manageable by the protection arises. Since at present the available bits for the IDentification (ID) of the source ($a_{K21}$, $a_{K22}$, $a_{K23}$, $a_{K24}$) or destination ($a_{K15}$, $a_{K16}$, $a_{K17}$, $a_{K18}$) nodes are only four, the existing telecommunication rings cannot have more than sixteen nodes. This obviously represents a high limitation in the development of communications networks.

Another problem related to the K1 and K2 bytes is that, when they change, there is an interrupt from the ASIC to the microprocessor for each changed byte (hence one or, at the most, two). In any case it is necessary to manage the temporality of the events to fully manage the information contained in the K1 and K2 bytes.

SUMMARY OF THE INVENTION

In view of the prior art drawbacks, the main object of the present invention is to provide a method of temporally managing, in an optimized manner, the information of the K1 and K2 bytes and therefore increasing the switching rate in a telecommunications ring. A correlated object of the present invention is also to provide a solution for increasing the maximum number of nodes that can be present and managed by the APS protocol, in a communications ring.

A further object of the present invention is to provide an SDH (or SONET) frame with a proper byte that allows an optimization of the time management of the information of bytes K1 and K2 and allows the management of a ring with a number of nodes higher than sixteen, the highest number which is provided for at the present time.

These and further objects are achieved by means of a frame having the features set forth in independent claim 1 and a method having the features set forth in claim 7. Further advantageous features of the invention are set forth in the respective dependent claims.

The invention substantially provides for properly utilizing one byte of the MSOH section of the Section OverHead SOH: some bits of such byte are used as extension of the source node IDentification, some others as extension of the destination node IDentification and finally some others in order to optimize the reception of the change of information carried by the other bytes K1 and K2.

The invention will certainly result in being clear after reading the following detailed description, given by way of a mere exemplifying and non limiting example, to be read with reference to the appended drawings.

BRIEF DESCRIPTION OF THE DRAWINGS

In the drawings:

FIG. 1 schematically shows the function of the various bits of the K0 byte according to a first arrangement in accordance with the present invention;

FIG. 2 schematically shows the function of the various bits of the K0 byte according to a second and different arrangement in accordance with the present invention; and FIG. 3 schematically shows the known and standardized arrangement of the K1 and K2 bytes.

DESCRIPTION OF THE BEST MODE FOR CARRYING OUT THE INVENTION

While the present description and annexed claims mainly refer to SDH transmissions just for clarity reasons, it should be noted that this does not constitute a limitation due to the fact that the present invention clearly equally applies to SONET. Unless otherwise specified, whenever only "SDH" is mentioned, this also includes "SONET". The same is for Recommendations: while only ITU-T Recommendations are mentioned, this is just for reducing the description length, a man skilled in the art will easily be able to identify the corresponding equivalent ETSI Recommendations.

Therefore, in accordance with the present invention, one of the "available" bytes, namely a byte whose function has not been defined and/or standardized yet, of the MSOH (to this end reference should be made to the above-cited ITU-T Recommendation G.841) is used. Just for convenience, this being not a limitation, in this description such a byte will be defined as "K0 byte" or "K3 byte".

With reference to FIGS. 1 and 2, the K0 byte has bits relating to the source node IDentification, bits relating to the destination node IDentification and at least one bit for optimizing the reception of information carried by bytes K1 and K2.

The first bit arrangement (FIG. 1) of the K0 byte provides for two Source Node IDentification Extension (IDSNE) bits (bits $a_{K05}$, $a_{K06}$); the subsequent two bits (bits $a_{K07}$, $a_{K08}$) similarly contain a Destination Node IDentification Extension (IDDNE) whilst the other bits (bits $a_{K01}$, $a_{K02}$, $a_{K03}$, $a_{K04}$) are used for optimizing the reception of changes of the information carried by bytes K1 and K2. Through this first bit arrangement of the K0 byte, the number of the ring nodes may be up to 64.

The second bit arrangement (FIG. 2) of the K0 byte provides for three Source Node IDentification Extension (IDSNE) bits (bits $a_{K03}$, $a_{K04}$, $a_{K05}$); the subsequent three bits ($a_{K06}$, $a_{K07}$, $a_{K08}$) similarly contain a Destination Node IDentification Extension (IDDNE) whilst the other bits ($a_{K01}$, $a_{K02}$) are used for optimizing the reception of changes of the information carried by bytes K1 and K2. Through this second bit arrangement of the K0 byte, the number of the ring nodes may even be up to 128.

In practice, with the first bit arrangement of the K0 byte, the source node is identified by six bits (the first four bits (bits $a_{K21}$, $a_{K22}$, $a_{K23}$, $a_{K24}$) of the K2 byte and the two bits ($a_{K05}$, $a_{K06}$) of the K0 byte) whereas with the second arrangement the source node is identified by seven bits (the first four bits ($a_{K21}$, $a_{K22}$, $a_{K23}$, $a_{K24}$) of the K2 byte and the three bits ($a_{K03}$, $a_{K04}$, $a_{K05}$) of the K0 byte). The same applies to the destination node which in one case is identified by the second four bits (bits $a_{K15}$, $a_{K16}$, $a_{K17}$, $a_{K18}$) of the K1 byte and by the last two bits (bits $a_{K07}$, $a_{K08}$) of the K0 byte and, in the other case, again by the second four bits (bits $a_{K15}$, $a_{K16}$, $a_{K17}$, $a_{K18}$) of the K1 byte and by the last three bits (bits $a_{K06}$, $a_{K07}$, $a_{K08}$) of the K0 byte. In this manner, as said above, the number of nodes may be up to 64 or 128. It is a good thing to point out that the less significant bits are those of bytes K1 and K2 (for the source node, the less significant bit is the $a_{K24}$ bit, whereas for the destination node it is the $a_{K18}$ bit).

As to the "TOGGLE" bits which are dedicated to the change of information (bits $a_{K01}$, $a_{K02}$, $a_{K03}$, $a_{K04}$ in the first arrangement of the K0 byte and bits $a_{K01}$, $a_{K02}$ in the second arrangement) they change only in the presence of a change of the K1 byte, of the K2 byte or of the bits of the K0 byte. If the K0 byte (with the arrangement of FIG. 1) is conventionally 1100 at the beginning, should a bit of the K1 (or K2) byte change, the K0 byte would become 0011, an interrupt would be generated and both bytes K1 and K2 would be read out. In other words the TOGGLE of the K0 byte must simply say if K1 and/or K2 and/or K0 have changed. Therefore, in principle, one bit only, whose value could be 0 or 1 (e.g. 0 to indicate a change of K1 and/or K2, 1 to indicate no change at all or the contrary) would be enough. It is however evident that the bits reserved for the TOGGLE will generally be even in number (four for the arrangement according to FIG. 1 and two for the arrangement according to FIG. 2). However it is preferred, for higher safety, that the value of all the TOGGLE bits changes going from one condition (no change of K1, K2 or K0) to another (change of K1, K2 or K0). Thus one could have for instance: 0000/1111, 1100/0011, 1010/0101, 1001/0110 (arrangement of FIG. 1) and 11/00, 10/01 (arrangement of FIG. 2).

In other words, the "overall" or "extended" IDentification of the destination node is computed with the following algorithm:

$$IDDN_{K1+K0}=IDDN_{K1}+16*IDDNE_{K0}$$

Where: $IDDN_{K1+K0}$=binary number "extended" IDentification of the Destination Node (calculated by using the bits of K1 and K0); $IDDN_{K1}$=binary number IDentification of the Destination Node (bits $a_{K15}$, $a_{K16}$, $a_{K17}$, $a_{K18}$); $IDDNE_{K0}$=binary number Extension of the Destination Node IDentification (bits $a_{K07}$, $a_{K08}$; $a_{K06}$, $a_{K07}$, $a_{K08}$). The bit sequence will be one of the following: $a_{K07}$ $a_{K08}$ $a_{K15}$ $a_{K16}$ $a_{K17}$ $a_{K18}$ or $a_{K06}$ $a_{K07}$ $a_{K08}$ $a_{K15}$ $a_{K16}$ $a_{K17}$ $a_{K18}$ (where $a_{K18}$ is the less significant bit).

Similarly, the "overall" or "extended" IDentification of the Source Node is calculated with the following algorithm:

$$IDSN_{K2+K0}=IDSN_{K2}+16*IDSNE_{K0}$$

Where: $IDSN_{K2+K0}$=binary number "extended" IDentification of the Source Node (calculated by using the bits of K2 and K0); $IDSN_{K2}$=binary number IDentification of the Source Node (bits $a_{K21}$, $a_{K22}$, $a_{K23}$, $a_{K24}$); $IDSNE_{K0}$=binary number Extension of the Source Node IDentification (bits $a_{K05}$, $a_{K06}$; $a_{K03}$–$a_{K05}$). The bit sequence will be one of the following: $a_{K05}$ $a_{K06}$ $a_{K21}$ $a_{K22}$ $a_{K23}$ $a_{K24}$ o $a_{K03}$ $a_{K04}$ $a_{K05}$ $a_{K21}$ $a_{K22}$ $a_{K23}$ $a_{K24}$ (where $a_{K24}$ is the less significant bit).

Both the algorithms in question can of course be performed by a software program running in a computer and therefore the scope of the present invention extends to such a software program and to a computer memory into which the software program has been loaded.

In practice, in the solution according to the present invention the K0 byte is partially and primarily used to indicate whether information contained in the K bytes (K1 and K2) or in K0 is changed and has to be analyzed or not. Hence an interrupt is possibly generated only upon receipt of the K0 byte and after the readout thereof.

The person skilled in the art will acknowledge that it would also be possible to use the first four bits of the K0 byte for the Source Node Extension IDentification (IDSNE) and the subsequent four bits for the Destination Node Extension IDentification (IDDNE): in this way the telecommunications ring could have up to 256 nodes but switching would certainly be slower since in reception the information contained in K1 and in K2 would be read and the interrupts would be activated in reception by the same bytes K1 and K2. In other words, at each node of the ring, K1 is read/written but one has to wait a certain time for K2 and K1. A further possible bit arrangement of the K0 byte could also provide for a sole bit (for instance $a_{K01}$) as an extension of the source node, only one extension bit (e.g. $a_{K02}$) of the destination node and one or more of the remaining bits ($a_{K03}$–$a_{K08}$) as TOGGLE: the maximum number of manageable nodes however would be only 32.

As far as the present invention is concerned, in transmission the transmitter must take care of sending first the bytes K1 and K2 and only finally K0 byte: only if the latter contains in the "TOGGLE" field a code which different from the preceding one, it will trigger the interrupt. Only at this point the entire information contained in the three bytes will be read.

Naturally, the inventive concepts of the present invention are however valid also in the case where the order of the bits is not that indicated in FIGS. 1 and 2. In other words, the toggle bits could also be the last four or the last two of K0 (namely, the less significant ones) and not necessarily the first four and the first two. Similarly, the order of the IDSNE and IDDNE bits could be inverted without impairing the generality of the present invention.

Lastly, as far as the position of the K0 byte is concerned, there are no special constraints except that of using one of the bytes so far not utilized by the SDH (or SONET) frame.

Conventionally, for reasons of possible future use of the other bytes, it is preferred that the K0 byte is in the $9^{th}$ row and $9^{th}$ column of the first STM-1, in practice the one in the lower right-hand corner.

There has thus been shown and described a novel frame and a novel method which fulfill all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A computer is configured to produce a transmission frame, said computer comprising:
   a processor, and a memory including software instruction is configured to enable the computer to perform the step of:
   producing the transmission frame having a first, a second, and a third byte,
   wherein the transmission frame comprises:
      a section overhead with a Regeneration Section Overhead (RSOH) and a Multiplex Section Overhead (MSOH), in which said MSOH comprises the third byte comprising at least one Source Node IDentification Extension bit, at least one Destination Node IDentification Extension bit and at least one bit indicating a change of the information in at least one of the first, the second and third byte: and
      said RSOH comprising the first and the second byte, said first byte comprising bits identifying the destination node and said second byte comprising bits identifying the source node, wherein said Source Node Identification Extension bits and said Destination Node Identification Extension bits, each comprise two bits and said at least one bit indicating a change of the information is four in number.

2. The computer according to claim 1, wherein said Source Node IDentification Extension bits are fifth and sixth bits of the third byte, said Destination Node IDentification Extension bits are subsequent two bits and said bits indicating the information change are first four bits.

3. The computer according to claim 1, wherein the third byte is located at $9^{th}$ row, $9^{th}$ column of first STM-1 of the transmission frame.

4. A computer is configured to produce a transmission frame, said computer comprising:
   a processor, and a memory including software instruction is configured to enable the computer to perform the step of:
   producing the transmission frame having a first, a second, and a third byte, wherein the transmission frame comprises:
      a section overhead with a Regeneration Section OverHead (RSOH) and a Multiplex Section OverHead (MSOH), in which said MSOH comprises the third byte comprising at least one Source Node Identification Extension bit, at least one Destination Node IDentification Extension bit and at least one bit indicating a change of the information in at least one of the first, the second and the third byte; and
      said RSOH comprising the first byte and the second byte, said first byte comprising bits identifying the destination node and said second byte comprising bits identifying the source node,
   wherein both said Source Node IDentification Extension bits and said Destination Node IDentification Extension bits are three bits and said bits indicating the information change are two in number.

5. The computer according to claim 4, wherein said Source Node IDentification Extension bits are third, fourth and fifth bits of the third byte, said Destination Node IDentification Extension bits are subsequent three bits and said bits indicating the information change are first two bits.

6. A transmitter is configured to transmit information carried by a transmission frame, comprising:
   a processor, and
   a memory including software instruction is configured to enable the transmitter to perform the steps of:
   producing the transmission frame having a first byte, a second byte, and a third byte, in which bits of the third byte of the MSOH are arranged in a way that at least one of said bits represents an Extension of Source Node IDentification and at least one of said bits represents an Extension of Destination node IDentification and at least one of the remaining bits indicates an information change in said at least one of said first, said second and said third byte; and transmitting the produced transmission frame,
   wherein both said Source Node IDentification Extension bits and said Destination Node IDentification Extension bits are two in number and said bits indicating the information change are four in number.

7. The transmitter according to claim 6, wherein in transmitting the transmission frame, the first and the second bytes are sent first and finally the third byte is sent.

8. The transmitter according to claim 6, wherein in receiving the transmission frame, the first and second bytes are read if at least one but preferably all bits indicating the information change of the third byte are changed and as a result an interrupt is generated.

9. The transmitter according to claim 8, wherein the Destination Node IDentification Extension is calculated with the following algorithm:

$$IDDN_{K1+K0}=IDDN_{K1}+16IDDNE_{K0}$$

where: $IDDN_{K1+K0}$=binary number "extended" IDentification of the Destination Node (calculated by using the bits of the first and third byte); $IDDN_{K1}$=binary number IDentification of the Destination Node; $IDDNE_{K0}$=binary number Extension of the Destination Node IDentification.

10. A computer program running on the transmitter comprising means for implementing the algorithm set forth in claim 9 or 12.

11. A computer readable medium having a computer program recorded thereon, said computer readable medium comprising means for implementing the algorithm indicated in claim 9.

12. The transmitter according to claim 8, wherein the Extension of Source Node IDentification is calculated with the following algorithm:

$$IDSN_{K2+K0}=IDSN_{K2}+16IDSNE_{K0}$$

Where: $IDSN_{K2+K0}$=binary number Extended IDentification of the Source Node (calculated by using the bits of the second byte and the third byte); $IDSN_{K2}$=binary number IDentification of the Source Node; $IDSNE_{K0}$=binary number Extension of the Source Node IDentification.

13. A transmitter is configured to transmit information carried by a transmission frame, comprising:
  a processor, and
  a memory including software instruction is configured to enable the transmitter to perform the step of:
  producing the transmission frame having a first byte, a second byte, and a third byte, in which bits of the third byte of the MSOH are arranged in a way that at least one of said bits represents an Extension of Source Node IDentification and at least one of said bits represents an Extension of Destination Node IDentification and at least one of the remaining bits indicates an information change in said at least one of said first, said second and said third byte; and
  transmitting the produced transmission frame,
  wherein both said Source Node IDentification Extension bits and said Destination Node IDentification Extension bits are three in number and said bits indicating the information change are two in number.

14. A data transmission apparatus is configured to produce a transmission frame, said data transmission apparatus comprising:
  a processor, and a memory including software instruction is configured to enable the data transmission apparatus to perform the step of:
  producing the transmission with a first, a second and a third byte,
  wherein the third byte is used by the processor to manage in an optimized manner, information contained in the first and the second byte of the transmission frame, and
  wherein said third byte comprises at least one Source Node IDentification Extension bit, at least one Destination Node IDentification Extension bit and at least one bit indicating a change of information in said at least one of said first, said second and said third byte,
  wherein said Source Node IDentification Extension bits and said Destination Node IDentification Extension bits, each comprise two bits and said at least one bit indicating a change of information are four in number.

15. A method of communicating between stations, comprising
  creating a transmission frame having a section overhead with a Regeneration Section OverHead (RSOH) and a Multiplex Section OverHead (MSOH); and
  transmitting said created transmission frame from a first station to a second station,
  wherein said RSOH comprising a first byte and a second byte, said first byte comprises bits identifying the destination node and said second byte comprising bits identifying the source node, and wherein said MSOH comprises a third byte comprising at least one Source Node IDentification Extension bit, at least one Destination Node IDentification Extension bit and at least one bit indicating a change of the information in said at least one of said first, said second and said third byte,
  wherein said Source Node IDentification Extension bits and said Destination Node IDentification Extension bits, each comprise two bits and said at least one bit indicating change of information are four in number.

16. The method of communicating between stations according to claim 15, wherein said Source Node IDentification Extension bits has fifth and sixth bits of the third byte, said Destination Node IDentification Extension bits has subsequent two bits and said information change has first four bits.

17. The method of communicating between stations according to claim 15, wherein the third byte is located at $9^{th}$ row, $9^{th}$ column of first STM-1 of the transmission frame.

18. A method of communicating between stations, comprising:
  creating a transmission frame having a section overhead with a Regeneration Section OverHead (RSOH) and a Multiplex Section OverHead (MSOH); and
  transmitting said created transmission frame from a first station to a second station,
  wherein said RSOH comprising a first byte and a second byte, said first byte comprises bits identifying the destination node and said second byte comprising bits identifying the source node, and wherein said MSOH comprises a third byte comprising at least one Source Node IDentification Extension bit, at least one Destination Node IDentification Extension bit and at least one bit indicating a change of the information in said at least one of said first, said second and said third byte,
  wherein both said Source Node IDentification Extension bits and said Destination Node IDentification Extension bits have three bits and said at least one bit indicating a change of information are two in number.

19. The method of communicating between stations according to claim 18, wherein said Source Node IDentification Extension bits has third, fourth and fifth bits of the third byte, said Destination Node IDentification Extension bits has subsequent three bits and said information change has first two bits.

20. A method of communicating in a network comprising:
  producing a transmission frame; and
  transmitting said produced transmission frame with a transmitter,
  wherein use of a third byte of the transmission frame to manage in an optimized manner information contained in a first and a second byte of the transmission frame, and wherein said third byte comprises at least one Source Node IDentification Extension bit, at least one Destination Node IDentification one of the first, the second and the third byte,
  wherein said Source Node IDentification Extension bits and said Destination Node IDentification Extension bits, each comprise two bits and said at least one bit indicating a change of information are four in number.

* * * * *